United States Patent [19]

Meissner

[11] 4,206,697
[45] Jun. 10, 1980

[54] METHOD AND APPARATUS FOR SELECTIVE PITTING OF FRUITS OF THE DRUPE TYPE

[75] Inventor: Konrad E. Meissner, Lafayette, Calif.

[73] Assignee: California Processing Machinery, San Ramon, Calif.

[21] Appl. No.: 922,183

[22] Filed: Jul. 5, 1978

Related U.S. Application Data

[63] Continuation-in-part of Ser. No. 880,229, Feb. 22, 1978.

[51] Int. Cl.² .......................... A23N 4/04; A23N 4/22
[52] U.S. Cl. .......................................... 99/489; 99/551; 99/553; 99/554; 426/485
[58] Field of Search .................. 99/489–491, 99/544, 545, 547, 551–554, 562; 426/485

[56] References Cited

U.S. PATENT DOCUMENTS

| | | |
|---|---|---|
| 1,785,019 | 12/1930 | Thompson et al. |
| 1,785,021 | 12/1930 | Whipple . |
| 1,785,022 | 12/1930 | Duncan . |
| 1,949,641 | 3/1934 | Awa et al. ........................ 99/553 |
| 3,331,418 | 7/1967 | Amori .............................. 99/491 |
| 3,465,799 | 9/1969 | Tomelleri ........................ 99/553 |
| 3,829,591 | 8/1974 | Browne ........................... 426/485 |
| 4,054,675 | 10/1977 | Spence ............................ 426/485 |
| 4,109,570 | 8/1978 | Silvestrini ....................... 99/551 |
| 4,122,765 | 10/1978 | Silvestrini ....................... 99/551 |
| 4,158,993 | 6/1979 | Spence ............................ 99/551 |

*Primary Examiner*—Harvey C. Hornsby
*Assistant Examiner*—Timothy F. Simone

[57] ABSTRACT

Apparatus and methods are described for pitting fruit of the drupe type in a cyclical manner in a processing operation involving a series of processing steps in which fruit having a sound pit is torque pitted and fruit having a split pit is spoon pitted. In the apparatus and method the presence or absence of a fruit to be supplied to the pitting station from a preceding station is sensed and the cyclical operation of the process and the apparatus with the cyclical sequence of steps and machine operations is varied depending upon whether a fruit is presented to the pitting station during a cycle of operation or not, and if a fruit so presented has a sound or split pit. When a fruit having a split pit is presented, a coring spoon spaced from the pit gripping portion of fruit bisecting blades is moved into position by moving the blades and coring spoon through the fruit and between the halves of the split pits for cutting a core including the split pit from the fruit. If no fruit is presented during a cycle of operation the fruit gripping structure at the pitting station is disabled.

4 Claims, 18 Drawing Figures

METHOD AND APPARATUS FOR SELECTIVE PITTING OF FRUITS OF THE DRUPE TYPE

RELATED APPLICATIONS

This application is a continuation-in-part of my patent application Ser. No. 880,229 filed Feb. 22, 1978, and entitled "Selective Pitter for Fruits of the Drupe Type."

BACKGROUND OF THE INVENTION

This invention relates generally to the field of methods and apparatus for pitting fruits of the drupe type. More particularly, it relates to apparatus for selectively torque pitting such fruits having sound pits and for automatically and selectively spoon pitting such fruit having split pits, irrespective of the order in which fruit having sound pits and fruit having split pits are presented to the pitting station.

The most common method and apparatus used in pitting fruits of the drupe type, such as peaches, apricots and the like, provide for torque pitting the fruit. In this technique, the fruit body halves are substantially bisected and the pit is gripped against rotation while the fruit body halves are rotated relative to and about an axis extending through the pit, thus twisting the fruit body halves free of the pit. However, it is not uncommon for some of the fruit presented to the pitting station to have unsound or split pits, this fruit being intermingled with other such fruit having sound pits. If the torque pitting technique is used with fruit having a split pit, generally all that is accomplished is the bisecting of the fruit and its split pit into two halves and then passing the fruit body halves with their attached pit halves onto subsequent stations where these fruit body halves must be repitted with a coring spoon to remove these split pit halves.

One seemingly obvious solution to the problem is to use a spoon pitting machine to cut a core which includes the split pit from each of the fruits presented, regardless of whether the fruit has a split or sound pit. However, since a spoon pitting machine must necessarily cut a core from each fruit at least as large as the largest pit anticipated, it necessarily removes some of the pulp, or meat, adjacent the pit in order that it may stay clear of the pit itself. This causes a loss of saleable fruit pulp from fruit having sound pits, which loss would not occur had torque pitting been used. Various compromise solutions to this problem have been attempted by canners. One such solution has been the provision of separate torque pitting and spoon pitting lines in the canneries, with batches of fruit suspected of having a high incidence of split pits being processed along the spoon pitting line and all other fruit being processed along the torque pitting line. This compromise has been unsatisfactory in its requirement for different sets of torque pitting and spoon pitting equipment, some of which may lie idle if fruit having split pits or sound pits is not available. Additionally, there likely will remain the requirement for spoon pitting the still substantial number of split pit fruit processed along the torque pitting line.

An improvement over the initial compromise may be found by using the convertible equipment similar to that disclosed in Brown U.S. Pat. No. 3,829,591 and in the further improved selective pitting apparatus of Spence U.S. Pat. No. 4,054,675. In the structure of the Spence patent a single pitting apparatus detects the presence of split or sound pits and adjusts the apparatus accordingly. Thus, with the Spence apparatus, fruit having sound pits may be torque pitted, to reduce the loss of available fruit pulp, while fruit having split pits would generally be spoon pitted, as required. By the provision of such selective apparatus the unnecessary and wasteful duplication of equipment may be reduced and a substantially higher yield of properly pitted fruit obtained. However, even when the Spence apparatus is in its spoon pitting mode, it requires that the fruit halves be rotated, as in torque pitting, through a full circle relative to a stationary coring knife and about an axis normal to the plane of the fruit suture. This rotation not only may tear the pulp of the fruit as it is rotated by the bisecting blade, but also necessarily cuts a generally spherical core far larger than the oblong pit. The rotation of the fruit halves also tends to cut from and sling away from the pitting area pieces of the fruit. These pieces of the fruit, which normally are quite acidic, are then flung into other parts of the processing apparatus, and have promoted rust and corrosion of other metal pieces, and have required additional cleaning of the pitting area.

In most of the automated pitting apparatus of the prior art, the apparatus operates cyclically, performing some predetermined sequence of steps regardless of whether a fruit is received from a preceding processing station into the pitting station or not. Such steps typically have included the actuation of the fruit body bisecting blades and actuation of the fruit body halve gripping elements. Such gripping elements have included deformable or deflectable fingers and also mutually opposed, inflatable elastic cups. A disadvantage of the prior art has been that such gripping apparatus customarily is actuated and may interfere with the fruit body bisecting and pit gripping apparatus when no fruit is presented to the pitting station during a given cycle of operations. Such an event can lead to premature wear and damage to either the fruit body gripping structure or the body bisecting and gripping structure of the pitter.

SUMMARY OF THE INVENTION

To overcome the disadvantages of the prior art, it is an object of the present invention to provide a fruit pitting method and apparatus in which the presence or absence of a fruit to be presented from a preceding station to the pitting station is sensed, and any necessary modification of the operation of the pitter is effected. It is a further object to provide a drupe pitting method and apparatus in which the fruit presented may be selectively torque pitted or spoon pitted as required by the apparent soundness or unsoundness of its pit. It is a further object of this invention to achieve such pitting with a minimum loss of edible fruit pulp.

To achieve the foregoing, as well as other objects, a method and apparatus are provided for sensing the presence or absence of a fruit to be supplied from a preceding processing station to the pitting station and for selective pitting of drupes so presented having either sound or unsound pits. This method and apparatus provide for presenting and supporting the fruit at a single pitting station with its suture substantially in a predetermined plane, substantially bisecting the body of the fruit in that plane and moving opposing pit gripping means to the body of the fruit in the plane toward the edges of the pit while actuating means to grippingly engage the halves of the fruit body. If the pit is sound, the movement of the pit gripping means is stopped by the gripping engagement of the pit, and the pit gripping means hold the pit against rotation while the halves of the fruit body are rotated relative to the pit to shear the fruit body halves from the sound pit. If the pit is split, as indicated by movement of the pit gripping means past the pit gripping position into the pit, the pit gripping means are moved away from the pit and through the fruit body to bring a coring spoon, which is spaced from the pit gripping means, into a position in the plane which is adjacent the split pit. Then the coring spoon is rotated about an axis extending through the split pit such that the coring spoon rotation describes a body of revolution and cuts a core, including the split pit, corresponding to the body of rotation from the fruit halves. If the absence, at a processing station immediately preceding the pitting station, of a fruit to be supplied to the pitting station is sensed, the grippingly engaging means are disabled.

BRIEF DESCRIPTION OF THE DRAWINGS

The invention will be described with respect to a particularly preferred embodiment in which.

DESCRIPTION OF A PREFERRED EMBODIMENT

Figure 1:
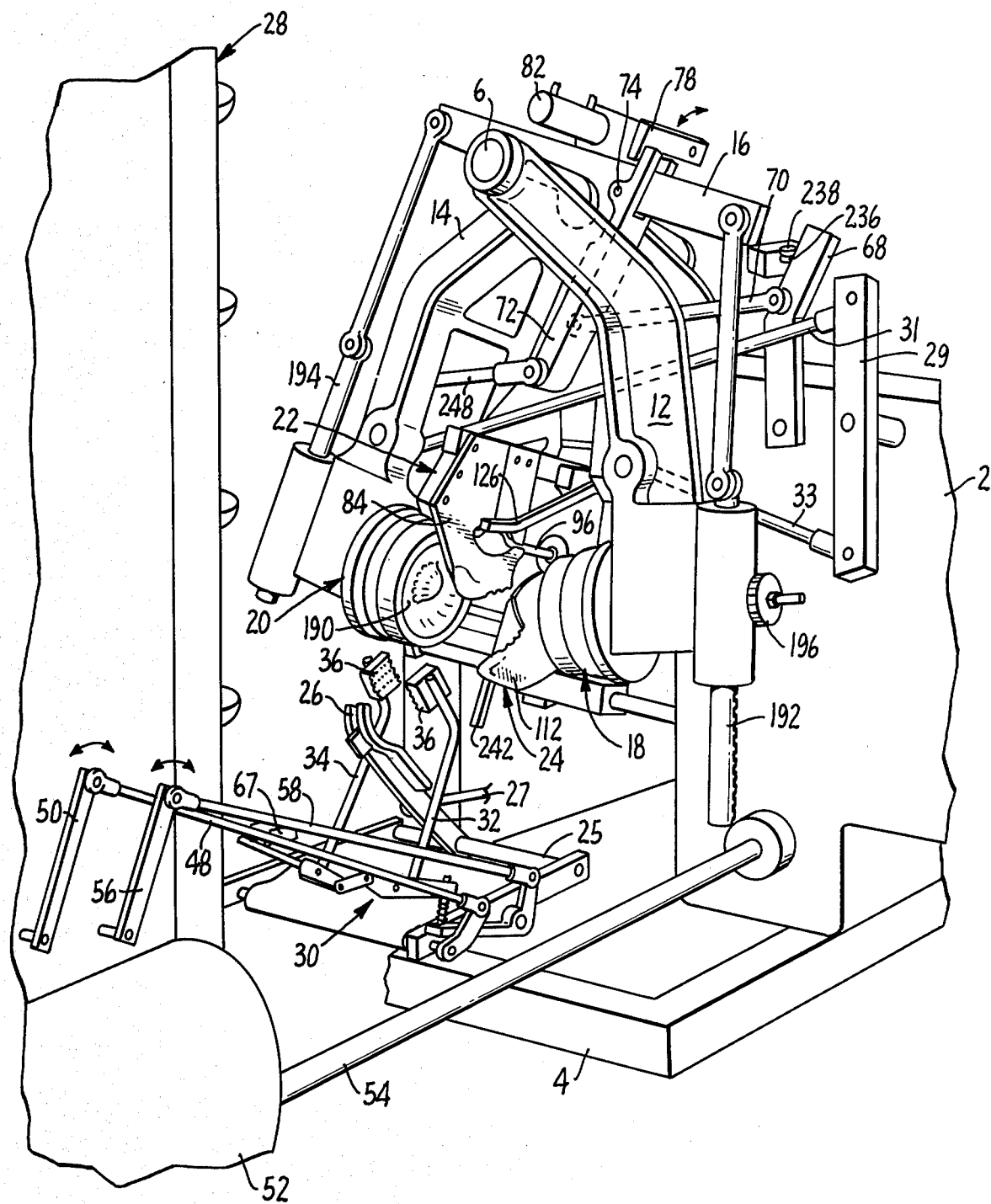
FIG. 1 is a partial front perspective view of the apparatus of this invention and of one form of apparatus suitable for practicing the method of this invention.

A particularly preferred embodiment for practicing the teachings of this invention is illustrated in the drawings. This apparatus is in some ways similar to the torque pitting apparatus disclosed in U.S. patent application Ser. No. 822,669, filed Aug. 8, 1977, in the name of Jesus Antonio Silvestrini, and owned by the assignee of the present invention. The present invention also incorporates an improvement to the fruit sensing structure of my copending application entitled "Improved Drupe Pitting Machine Having Apparatus for Preventing Deformation of the Fruit Gripping Structure When the Machine is Operated With No Fruit Present", and assigned to the assignee of the present invention. Since the present assignee is the owner of both of these prior and copending applications, the entire disclosures of those two applications are incorporated herein by reference. Substantial portions of those copending prior applications, such as the detailed configuration and operation of the fruit gripper heads, which form no direct portion of the present invention, have been omitted from the illustrations and from the detailed description in order to clarify the subject matter of the present invention.

As illustrated in FIG. 1, this apparatus comprises, in general, a gear box and cam housing 2, which is driven in a conventional manner by suitable means such as an electric motor (not shown) for providing the necessary mechanical action to the apparatus. The gear box 2 and the remainder of the pitter is mounted on a frame 4, a fragment of which is shown. Attached to the upper portion of gear box 2 by suitable brackets not shown, is gripper head pivot 6 to which are pivotally mounted the gripper head arms 12 and 14 and the gripper head rotating bell crank 16. Adjacent the lowermost extremities of each of the gripper head arms 12 and 14 are the respective fruit body gripper head assemblies, generally indicated by the reference numerals 18 and 20. Disposed between the two gripper head assemblies 18 and 20 is upper blade assembly 22 and movable lower blade assembly 24. A cup feeder 26 is pivotally mounted by shaft 25 to a portion of the frame 4 for movement toward and away from jaw assemblies 22 and 24 when actuated by actuating rod 27. A bell crank 29, pivotally mounted to and driven by the gear box 2, is connected by an upper push rod 31 to pivotally mounted gripper head arm 14 and by lower push rod 33 to the other pivotally mounted gripper head arm 12. Thus, the clockwise rotation of the bell crank 29 will serve to pivot the two arms 12 and 14 to bring the gripper head assemblies 18 and 20 together, with the counterclockwise rotation of the bell crank 29 moving those gripper heads apart.

As shown in FIG. 1 and more clearly in FIGS. 2 through 4, this pitting apparatus also includes apparatus for transferring fruit from a preceding fruit processing station 28, which may suitably be an aligner or orientor for aligning the drupe, such as peaches, to an orientation such as will be described below. This transfer apparatus, generally indicated by reference numeral 30, is mounted to a portion of support frame 4 for pivotal movement between a position for grippingly receiving fruit from the preceding processing station 28 and a position in which the feed cup 26 may take such a fruit for insertion into the remainder of the pitting apparatus.

This transfer apparatus 30 includes gripper arms 32 and 34, at the upper extremity of each of which is a fruit gripper head 36. These arms 32 and 34 are mounted, by means of pivot shafts 38 and 40, to a support member 42, which in turn is pivotally mounted by shaft 44 to the frame 4. Extensions of the arms 32 and 34 are operatively linked together by link 46, so that pivotal movement of one will be transferred to the other.

Movement of the member 42 about its pivot shaft 44 is controlled by push rod 48 which is actuated by crank 50 driven by gear box 52, which in turn is driven by shaft 54 from gear box 2. Also driven by gear box 52 is crank 56, which actuates shaft 58 and pivotally moves the crank 60 about its pivotal attachment 62 to the frame 4. As seen in FIGS. 2 and 4, clockwise movement of the crank 60 exerts an upward pressure on springs 64, which bears against the underside of the extension of fruit gripper arm 32. This upward pressure against the spring 64 thus urges the arm 32, and its linked arm 34, to pivot inwardly, toward the phantom line position of FIG. 4. If a fruit is present between the transfer gripper heads 36, this inward pivoting will be stopped by contact with the fruit body. A valve actuating rod 66 extends outwardly from the lower portion of gripping arm 34 and is pivotally movable with that gripping arm between the solid line and phantom line position illustrated in FIG. 4. An air valve 67 is mounted to the frame 4 in such a position that it will be actuated, for purposes to be described below, only when the valve actuating arm 66 is moved to its uppermost position, as shown in phantom in FIG. 4, which position can be reached only when no fruit is interposed between the fruit gripper heads 36.

The pivotal movement of the body 42 is controlled by push rod 48 and crank 50 to move the transfer gripper heads 36 between a position where a fruit from the preceding processing station 28 is presented to the transfer apparatus 30 for pitting, and a position where the cup feeder 26 may take a fruit from those heads 36 for feeding into the remainder of the pitting apparatus.

Figure 5:
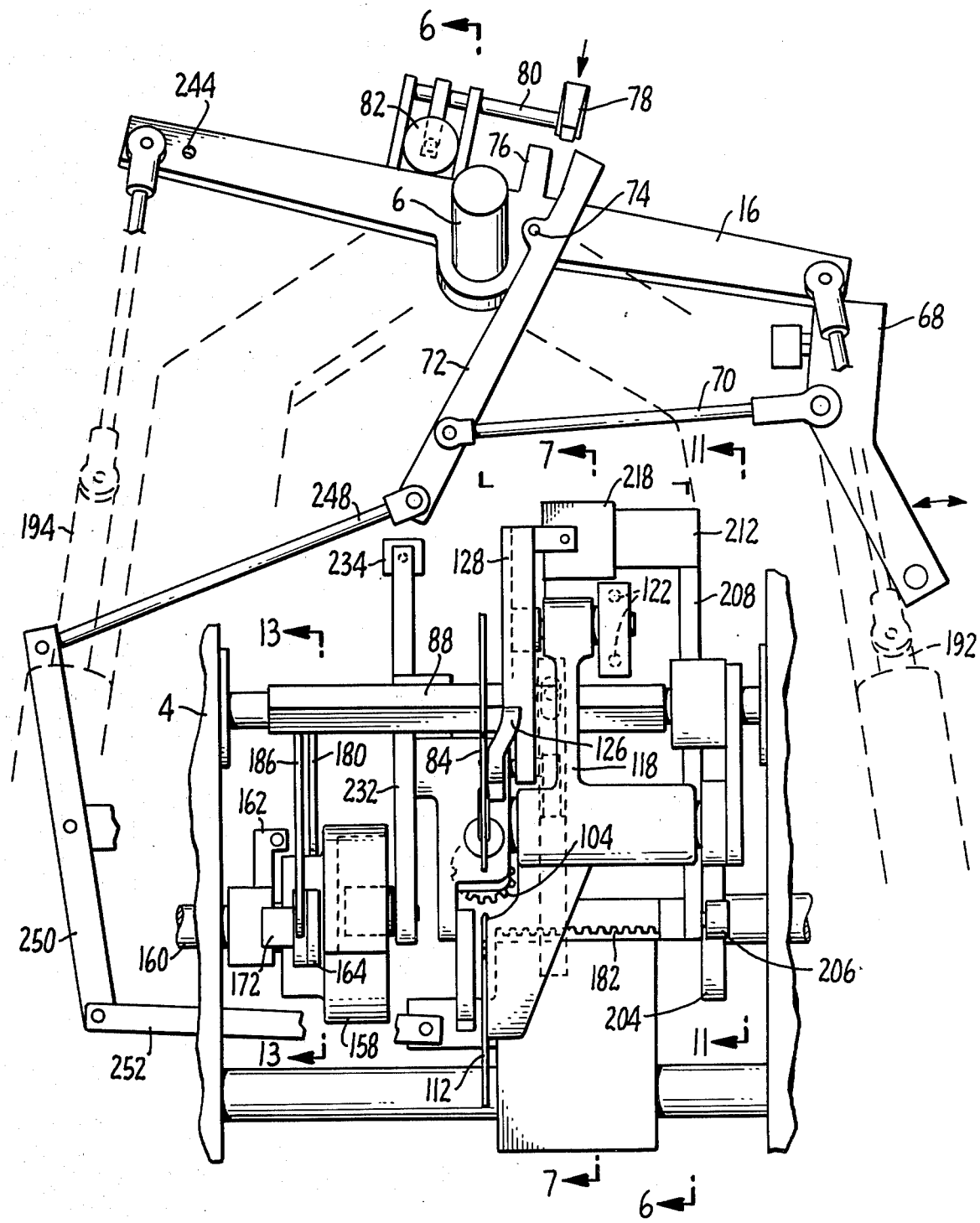
FIG. 5 is a front elevation, partially in phantom, of the apparatus of FIG. 1.

As shown in FIG. 1, and more clearly in FIG. 5, a crank arm 68, is pivotally mounted to and driven by the gear box 2. This crank arm is connected by push rod 70 to a linking arm 72 which is mounted by pivot shaft 74 to bell crank 16. When this linkage member 72 is pivoted to its extreme position clockwise, shown in FIG. 5, a space is provided between the upward extremity of this member 72 and an actuating tab or projection 76 atop bell crank 16. In this position an actuating dog 78 may be pivoted on its shaft 80 under actuation by air cylinder 82 between two positions. One position is the engaged position with the dog 78 interposed between the tab 76 and the upper extremity of member 72, and the other position is the disengaged position illustrated in FIG. 5, with the dog 78 lifted from between the tab 76 and the member 72, all for purposes to be described below.

The jaw or blade assemblies 22 and 24 are best illustrated in the side sectional views of FIGS. 6 through 9. The upper blade assembly 22 comprises generally cutting and pit gripping blade 84 rigidly affixed to mounting arm 86, which in turn is pivotally mounted to the pitting apparatus by a shaft 88. The cutting blade 84 includes on its forward and lower portions sharpened cutting surfaces 90, including a plurality of pit gripping teeth 92.

Figure 6:
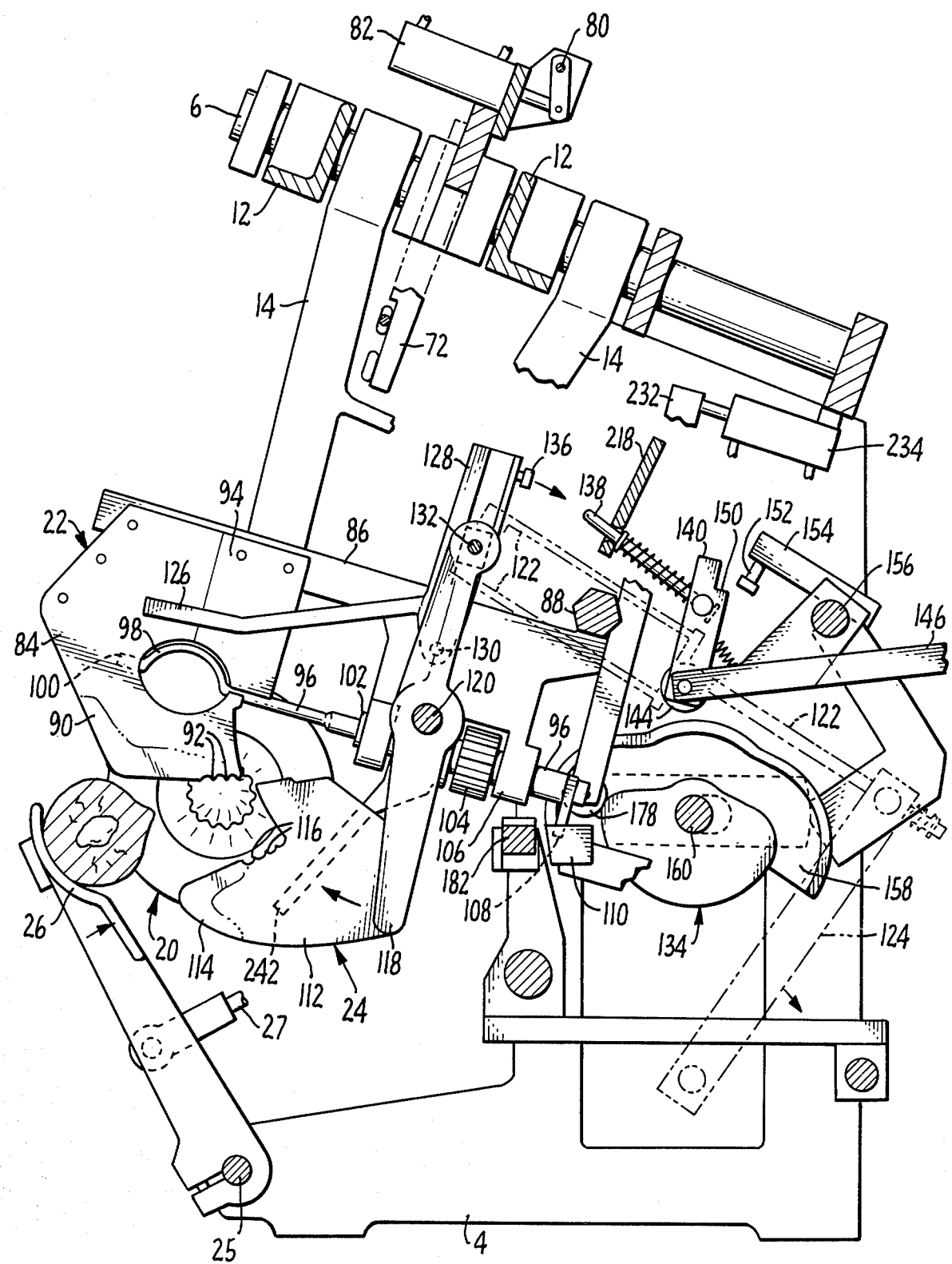
FIG. 6 is a side sectional view, taken along line 6—6 of the apparatus of FIG. 5.
Figure 7:
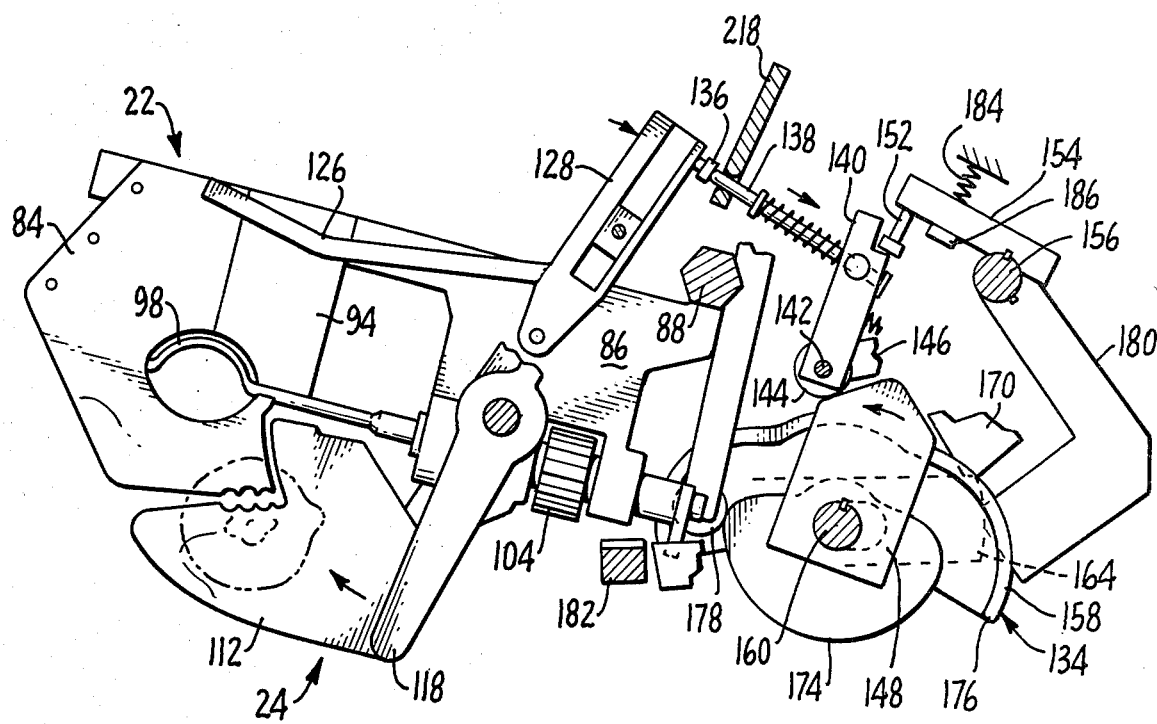
FIG. 7 is a side sectional view, taken along line 7—7, of a portion of the apparatus of FIG. 5.
Figure 9:
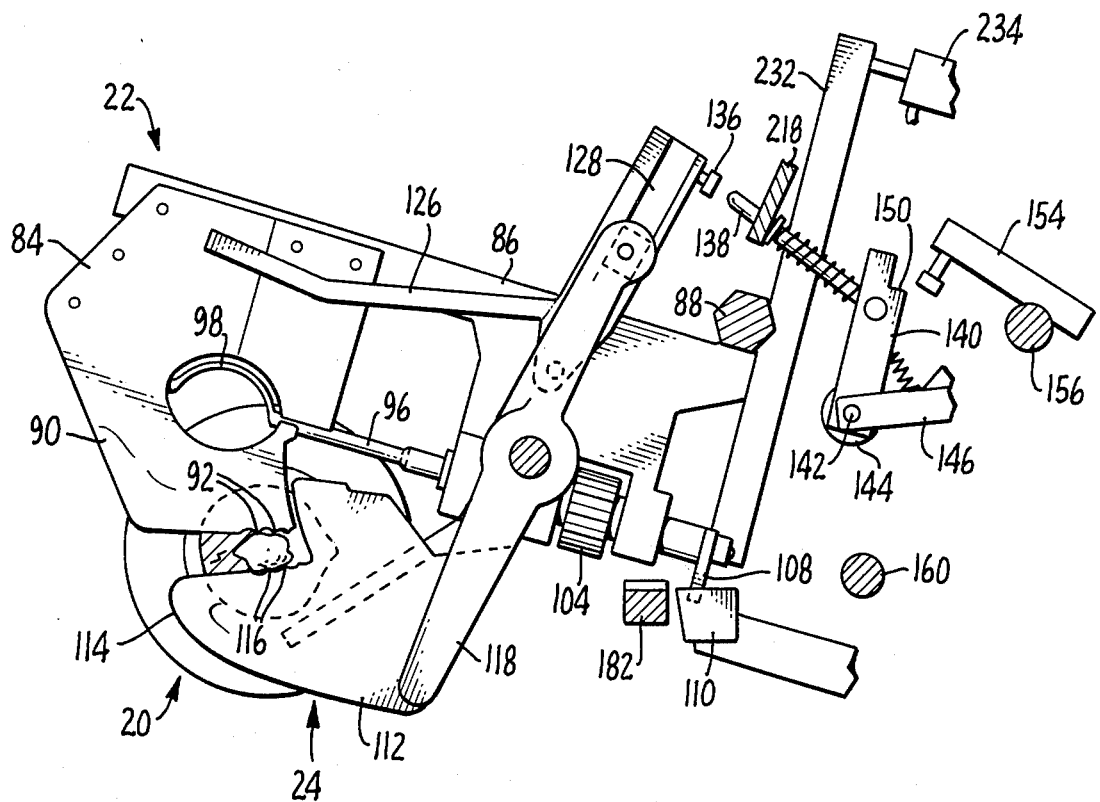
FIG. 9 is a fragmentary side sectional view, similar to FIG. 7, but showing the apparatus in its pit gripping configuration for torque pitting.

Immediately adjacent and behind blade 84 is coring spoon support 94, which suitably is of metal plate material similar to that of blade 84 and also is rigidly affixed to support 86. Along the lowermost edge of the coring spoon support 94 is provided a groove which rotatably receives the shaft 96 of coring spoon 98. Coring spoon 98, as illustrated, is generally of a flattened U or semielliptical shape with shaft portions 96 and 100 extending outwardly from the ends of the legs of the U. The portion of the coring spoon 98 facing outwardly of the plane of the paper of FIGS. 6, 7 and 9 is sharpened to form a cutting surface. The shaft portion 100 of the spoon is rotatably received into a journal formed within blade 84 adjacent the aperture within which the spoon 98 is housed. By the support of the shaft 96 in the groove on support 94 and the bearing portion 100 within the journal in the blade 84, the spoon is thus supported for rotation about an axis extending generally transverse to the legs of the U. The end of shaft 96 remote from the spoon 98 is received into a bearing mount 102. On the opposite side of bearing mount 102 a pinion 104 is mounted to the shaft 96. The shaft 96 continues past pinion 104, through second bearing mount 106, and has a blade positioning tab 108 rigidly affixed to its extremity remote from the coring spoon 98. When the upper blade assembly 22 is in its upper position, as illustrated in FIGS. 6, 7 and 9, this tab 108 is received within a channel formed by a pair of spaced plates 110, thus preventing rotation of shaft 96 and holding coring spoon 98 in a position lying in the plane of upper blade 84 and thus shrouded by that blade.

The lower blade or jaw assembly 24 includes lower blade 112 having a sharpended cutting edge 114 with a plurality of pit gripping teeth 116. This lower blade 112 is rigidly affixed to blade mount 118, which is pivotally mounted by shaft 120 to upper blade mounting arm 86. The end of actuating arm 118 is pivotally connected to bifurcated push rod 122 (shown in phantom in FIG. 6), which in turn is resiliently connected to crank 124 driven by gear box 2. The connection between the push rod 122 and the crank 124 provides a spring-biased lost motion linkage for operation in a manner to be described below. A pit knocker 126 extends alongside upper blade 84 and is rigidly attached to arm 128, which is pivotally mounted to the upper blade mounting arm 86 by pivot 130. This arm 128 is also connected, by pivotal connection 132 to the lower blade support arm 118 and the bifurcated push rod 122, for movement with the lower blade assembly 24 and for other purposes to be described below.

The respective blade assemblies 22 and 24 are capable of two different modes of movement. In a first mode the upper blade assembly 22 remains stationary while clockwise pivoting of the crank arm 124 moves control rod 122, and thus lower blade control arm 118, to pivot the lower blade 122 toward the upper blade 84 to the first position, shown in FIG. 9, in the manner indicated in FIGS. 6 and 9. This movement of crank 124 and control rod 122 also pivot arm 128 clockwise as indicated in those same figures.

Figure 8:
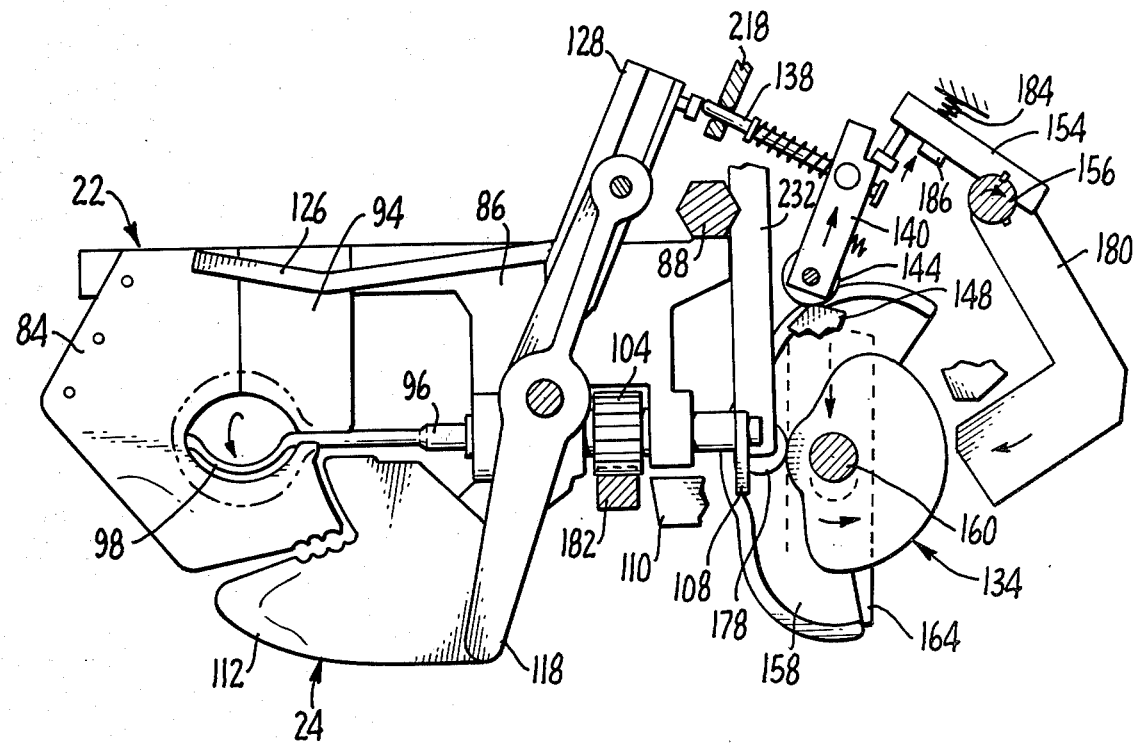
FIG. 8 is a side sectional view, corresponding to FIG. 7, with the cutting blades shifted to the spoon pitting position.

A second type of movement of the blade assemblies is illustrated in FIGS. 7 and 8, in which the lower blade assembly 24 has been pivoted beyond the first position to a second position, shown in FIG. 7, in close proximity with the upper blade assembly 22, and then both blade assemblies together have been pivotally moved a pedetermined amount in a counterclockwise direction in the pivotal mounting of shaft 88 to a third position, shown in FIG. 8. This second mode of pivoting, illustrated in FIGS. 7 and 8, is effected under control of the rotary cam assembly 134, which is illustrated in greater detail in FIGS. 13 through 15 and operates in the following manner.

When the pitting apparatus of this invention initiates its pitting cycle, the crank arm 124 rotates clockwise to close the lower blade assembly 24 toward a fruit inserted between the upper and lower blade assemblies. If, as in FIG. 9, a fruit (shown in phantom) with a sound pit has been inserted between the upper blade 84 and lower blade 112, the pivotal movement of the lower blade 112 and its support arm 118, and thus the connected pit knocker arm 128 will be stopped in their movement at the first position by the engagement of that pit between the blades as illustrated in FIG. 9. In this condition the contacting element 136 on the arm 128 will be stopped in its movement prior to contacting plunger 138. If, as in FIG. 7, the pit of the inserted fruit is split, the lower blade 112 and its mounting arm 118, and thus the connected arm 128, will continue their rotation past the first position until the contacting member 136 engages and pushes rearwardly the plunger 138. This plunger 138 is connected, through a spring biased lost motion linkage, to arm 140, which is connected by pivot 142 to cam follower 144 and cam follower arm 146. This movement of the plunger 138, in the direction of the arrow in FIG. 7, thus moves the step 150 on the arm 140 under the actuating member 152 connected to pivot arm 154, which is rigidly affixed to the pivot shaft 156, as illustrated in FIG. 7. With this step 150 positioned below the adjustable actuating member 152 of shaft 154, the passage of split pit detector bump cam 148 under cam follower 144 will drive the arm 140, and thus the actuating member 152 upwardly, pivoting arm 154 and shaft 156 in a clockwise direction. This clockwise pivoting of shaft 156 effects actuation of cam assembly 134 in the following manner.

Cam assembly 134 includes cam 158, which is journaled for free rotation about shaft 160. This shaft 160 is driven by the gear box 2 and drives the bump cam 148. Also rigidly affixed to rotating shaft 160 is cam driving arm 162. Sliding plate 164 is slidably attached within the channel 166 to the side of cam 158 and is slidable between the positions indicated by the solid line representation and the phantom line representation of FIG. 13. When in the phantom line position of FIG. 13, the slide abuts the lower extremity 168 of blocking member 170 and is thus restrained against counterclockwise motion. However, when slide member 164 has been urged to the left to the solid line position in FIG. 13, it is free from its engagement with the retaining member 170 and can, along with cam 158, rotate in a counterclockwise direction. For purposes of explanation, the end of the slide plate 164 which is shown in phantom engaging the blocking member 170 in FIG. 13 will be referred to as the first end of that plate 164, with the opposite end being referred to as the second end. Attached to the slide plate 164 and extending laterally outwardly adjacent the second end is driving tab 172 which, when urged toward the position of FIG. 14, which corresponds to the solid line representation of FIG. 13, lies in the path of rotation of the driving arm 162. Thus, rotation of the shaft 160 and of the driving arm 162 will engage that driving tab 172 and drive the slide plate 164 and its connected cam 158 around with the rotation of shaft 160.

Within the track formed by the inner lobe 174 and the partial outer track 176 of cam 158 rides cam follower 178, which is attached to upper blade support 86. By the configuration and positioning of cam 158 and the positioning of pivot shaft 88 supporting the upper blade mount 86, the upper blade assembly 22 and its pivotally connected lower blade assembly 24 is retained in the raised position of FIG. 7 whenever slide plate 164 is engaged with blocking member 170, as illustrated in phantom in FIG. 7. When cam 158 is permitted to rotate in a counterclockwise direction, as illustrated in FIG. 8, the configuration of cam 158 permits cam follower 178 to move to a position dropping the blade assemblies to the lowered position illustrated in FIG. 8. While the cam 158 may be rotatably driven by the driving arm 162 (FIGS. 13 and 14) the weight of the blade assembly itself may be sufficient to cause it to drop to the position illustrated in FIG. 8. In this position the coring spoon 98 is in position for spoon pitting a peach in a manner to be described below.

When the shaft 156 has been pivotally moved clockwise, under the actuation of the split pit detector bump cam 148, this also pivots the pusher arm 180 counterclockwise, which effects the sliding of plate 164 out of its engagement with the lowermost extremity 168 of blocking member 170. This sliding, to the left in FIGS. 13 and 14, of slide plate 164, also brings the driving tab 172 into the path of the driving arm 162, which is attached to the rotating shaft 160. Thus, this sliding of the plate 164 out of engagement with blocking member 170 provides for the rotation of the cam 158 to permit the blade assemblies to fall to the spoon pitting position illustrated in FIG. 8. As noted above, the clockwise rotation of shaft 156 which initiates this chain of events is itself caused by the over-rotation of the lower blade assembly 24 and actuation of the plunger 138, which thus serves to sense the presence of a split pit in the fruit presented to the pitting apparatus.

As illustrated in FIG. 8, when the blade assemblies are pivoted to their lower spoon pitting position, the pinion 104 is pivoted into engagement with rack 182, so that movement of the rack 182 may effect the coring rotation of the coring spoon 98. This same pivoting movement of the blade assembly also slides the rotation restraining tab 108 attached to the back end of shaft 96 out of engagement with the channel defined by the restraining plate 110, so that rotation of the shaft 96 upon the actuation of pinion 104 may take place.

As the shaft 160 continues to rotate, driven by gear box 2, the driving arm 162 will continue to drive the slide plate 164 attached to cam 158, thus continuing rotation of that cam 158. As the cam is rotated substantially past the position illustrated in FIG. 8, the profile of the cam then forces the cam follower 178 away from shaft 160, thus raising and resetting the blade assembly. Since, in the absence of the next fruit also having a split pit, arm 140 will not be in a position to effect movement of pivot arm 154 and thus pivoting of the shaft 156 in a clockwise direction, the compression spring 184 will urge the arm 154 down against stop 186, which is attached to the pitter frame. In this position the arm 180 will be pivoted to the position shown in FIG. 7 and in the phantom line representation of FIG. 13, out of the way of movement of the sliding plate 164 during its rotation.

Also attached to shaft 156 is slide plate reset arm 188, which moves together with the pivoting of shaft 156 and the movement of arm 180. Thus, when arm 180 urges the slide plate 164 to the left in FIG. 13, the reset arm 188 is lifted away from that sliding plate 164. Correspondingly, when the passage of the detector bump cam 148 permits the arm 154 to return to its position against the stop 186, the reset arm 188 will be pivoted downwardly into a position in the path of the second end of sliding plate 164, which is being driven by driving member 162 in FIG. 15. In this position, reset arm 188 engages the second end of slide plate 164 and slides it generally toward the right in FIG. 15. This movement of the slide plate 164 has two results. The plate 164 is slid back into engagement with the lowermost extremity 168 of the blocking member 170, preventing further rotation of the cam 158, and the driving tab 172 attached to slide plate 164 is slid out of engagement with the driving arm 162, so that that arm 162 may continue to rotate as shaft 160 is driven without effecting any rotation of cam 158. In this condition the blade assemblies are retained in the raised position illustrated in FIGS. 6, 7 and 9. The blade assembly will thus remain in that position until the plunger 138 is again actuated by the overtravel upon closing of the lower blade assembly 24, again indicating a split pit.

The fruit gripping heads 18 and 20 and their method of operation are described in detail in the above-referenced copending Silvestrini application. As noted above, these gripper heads are located adjacent the lower extremities of the pivotally mounted arms 12 and 14, respectively. When these arms 12 and 14 are pivotally moved toward one another, by the action of bell crank 29, the gripper heads 18 and 20 are brought into coaxial gripping engagement with the outer surfaces of a fruit presented to the pitter by feed arm 26. These gripper heads 18 and 20 thus grip the fruit on opposite sides of the plane defined by the blade assemblies 22 and 24, the suture of the fruit being oriented to lie generally in such plane with the stem end facing generally toward the rear of the apparatus. Actuation of the sensing valve 67 (FIGS. 1 and 4) by action of the transfer assembly 30, as described above, will disable the fluid control system supplying pressurized fluid, suitably air, to the inflatable gripper cups to prevent undesired inflation of the pneumatically controlled gripper cups 190 when no fruit is presented to the pitter from the preceding processing station.

Figure 10:
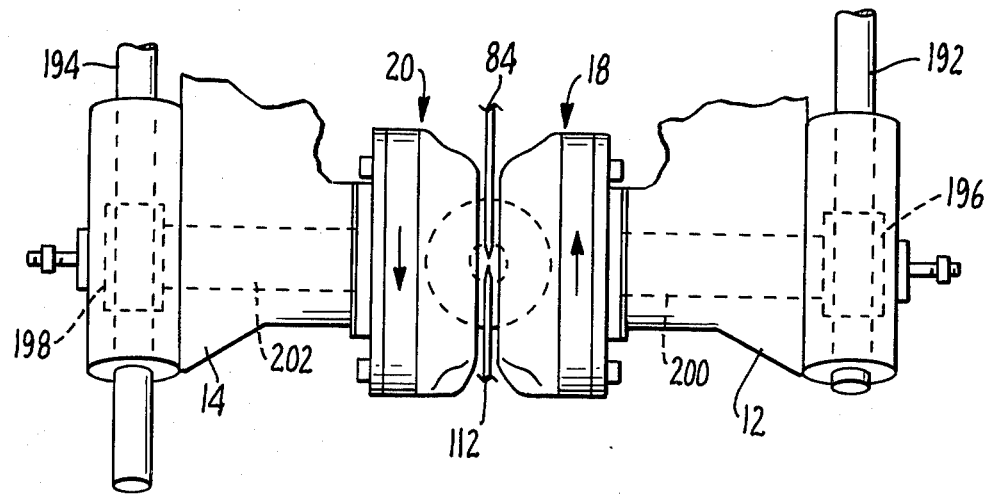
FIG. 10 is a fragmentary front elevation illustrating the operation of the gripper heads for torque pitting a fruit having a sound pit.

When torque pitting is desired with this apparatus, the gripper heads 18 and 20, closed and brought into gripping engagement with the fruit body halves shown in phantom in FIGS. 7 and 9, are rotated about their common axis, which is substantially normal to the plane of the blades and the suture. This rotation is effected by movement of the racks 192 and 194, which engage pinions 196 and 198, shown in phantom in FIG. 10. These pinions 196 and 198 are connected, respectively, to the gripper heads 18 and 20. The racks are moved in a generally vertical direction by the oscillation of the bell crank 16, under the influence of crank 68, driven by the gear and cam assembly 2, in a manner to be described below.

As previously noted, provision is made in this apparatus for disabling the inflation of the gripping cups 190 whenever there is no fruit provided from the preceding processing station during a cycle of operation of the pitter. In the absence of a fruit between the blades 84 and 112, the lower blade assembly 24 and arm 128 would overtravel in the same manner as detecting a split pit, thus causing actuation of the blade assembly moving apparatus for spoon pitting. To avoid unnecessary wear on the equipment, it is desirable to prevent such unnecessary operation of the blade assembly moving apparatus and the spoon pitting components. These disabling functions in response to the absence of a fruit to be supplied to the apparatus, are provided by the components illustrated most clearly in FIGS. 11 and 12. As shown in those figures, a valve actuating cam 204 is rigidly affixed to shaft 160, which also carries the detector bump cam 148. This valve cam 204 cooperates with cam follower 206 attached to the lower end of arm 208, which is pivotally mounted to the pitter frame on shaft 210. Attached to the end of arm 208 opposite the cam follower 206 is valve actuator 212, which when the pitter is provided with a fruit, engages the actuator button 214 of air valve 216 to provide air to the gripper cups 190. This arm 208 is moved to bring the actuator 212 into operative contact with the actuator button 214 when the cam follower 206 rides up upon the high section of the cam section 204, illustrated in FIG. 11.

Figure 11:
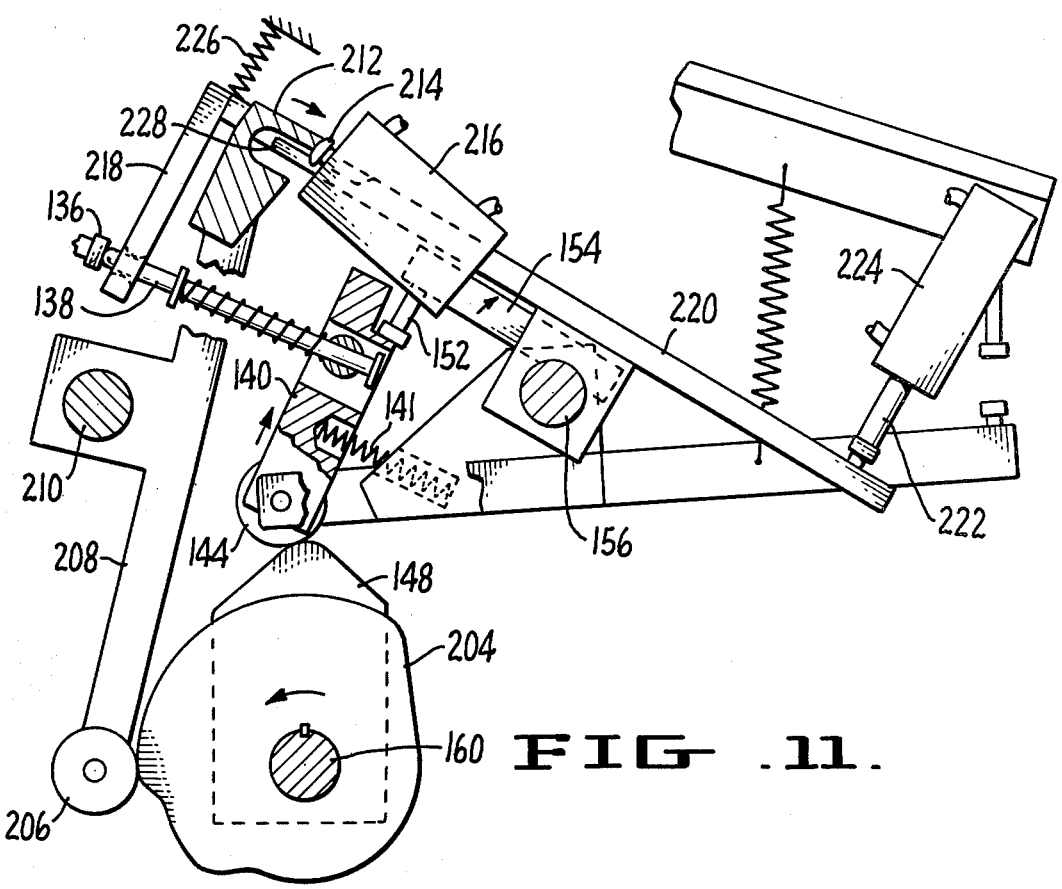
FIG. 11 is a fragmentary side sectional view, taken along line 11—11 of a portion of the apparatus of FIG. 5.

As may be seen in FIG. 11, the plunger 138 which operates the blade assembly shifting apparatus, is carried at its outer end in guide 218 which is mounted to one end of arm 220, which itself is pivotally mounted for free rotation about shaft 156, which is attached to the pitter frame. The air valve 216 which supplies air to the gripper heads is also attached to this arm 220. In the configuration of FIG. 11, which corresponds to that in which a fruit is provided from the preceding processing station for pitting, the arm 220 is in the position shown, which permits contact between the actuating member 212 and the valve button 214 and which also permits engagement between the actuator 136 and the plunger 138 if the pit of the fruit presented is split. In this configuration the end of arm 220 opposite that to which bracket 218 is attached has a boss which bears against the retracted shaft 222 of air cylinder 224. The arm 220 is maintained in this position under the urging of compression spring 226, which extends between the portion of the frame and the opposite end of the member 220.

Figure 12:
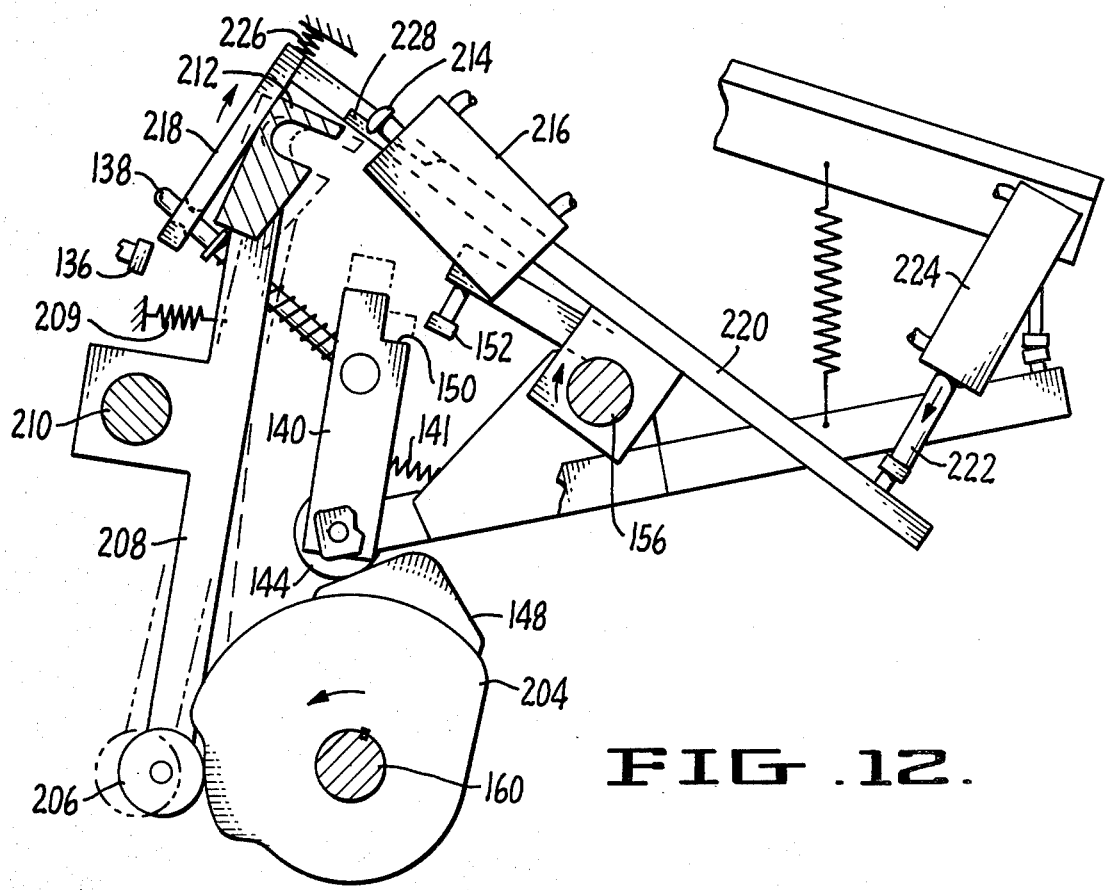
FIG. 12 is a fragmentary side sectional view, corresponding to FIG. 11, illustrating the actuation of a portion of the apparatus when no fruit is presented to the pitting station from a preceding station.

When no peach is presented to the transfer apparatus 30 for insertion into the pitter, the valve 67 (FIGS. 1 and 4) is open as described above, and provides air to cylinder 224, driving its shaft 222 outwardly and effecting pivoting of the member 220 in a clockwise direction against compression spring 226, as illustrated in FIG. 12. In this configuration the pivoting of the member 220 lifts the bracket 218 and thus lifts plunger 138 out of alignment with actuator 136, so that the plunger 138 cannot be actuated. Arm 140 thus is not pivoted against spring 141 to bring the step 150 under the actuating member 152. Thus, when the peak of detector bump cam 148 lifts the cam follower 144, the arm 140 will move up to the phantom line position of FIG. 12, without effecting pivoting of shaft 156, thus causing none of the actuation of the blade assembly cam structure 134 described with respect to FIGS. 13 through 15.

This same pivoting of the arm 220 also lifts the valve 216 so that the actuator button 214 is no longer in opposed relation with the actuator member 212 attached to the end of arm 208. Thus, when the arm 208 is pivoted clockwise to the phantom line position of FIG. 12, there will be no contact with the actuator button 214 and thus no air supplied to the gripper cups 190. Since the valve 68 supplying air to cylinder 224 may be opened for a shorter period of time than a full pitting cycle, during which entire cycle it is desired to effect the disablement of the gripper cups, the actuator member 212 is configured such that, upon its being pivoted clockwise by cam 204, the end of it will slide under tab 228 which forms a part of arm 220, as shown in phantom in FIG. 12. In this condition the arm 220 will be held in s clockwise pivoted position by the engagement between actuator member 212 and the tab 228 until the ow portion of cam 204 is brought around to engagement with cam follower 206, thus permitting the arm 208 to pivot counterclockwise, moving member 212 out from under tab 228 to permit the arm 220 to pivot counterclockwise back to the lowered position of FIG. 11.

From FIG. 11 it may be noted that the upper portion of the actuator member 212 has a hook-like configuration, such that, in the absence of pivoting of the member 220 prior to the clockwise pivoting of arm 208, the member 212 will overlie the tab 228 and thus hold the arm 220 in the position shown in FIG. 11, even if air pressure is applied to cylinder 224. By the use of all this structure, it may be seen that both the inflation of the gripper cups 190 and the movement of the blade assemblies necessary for spoon pitting may be disabled whenever no peach is provided from the preceding processing station.

Figure 16:
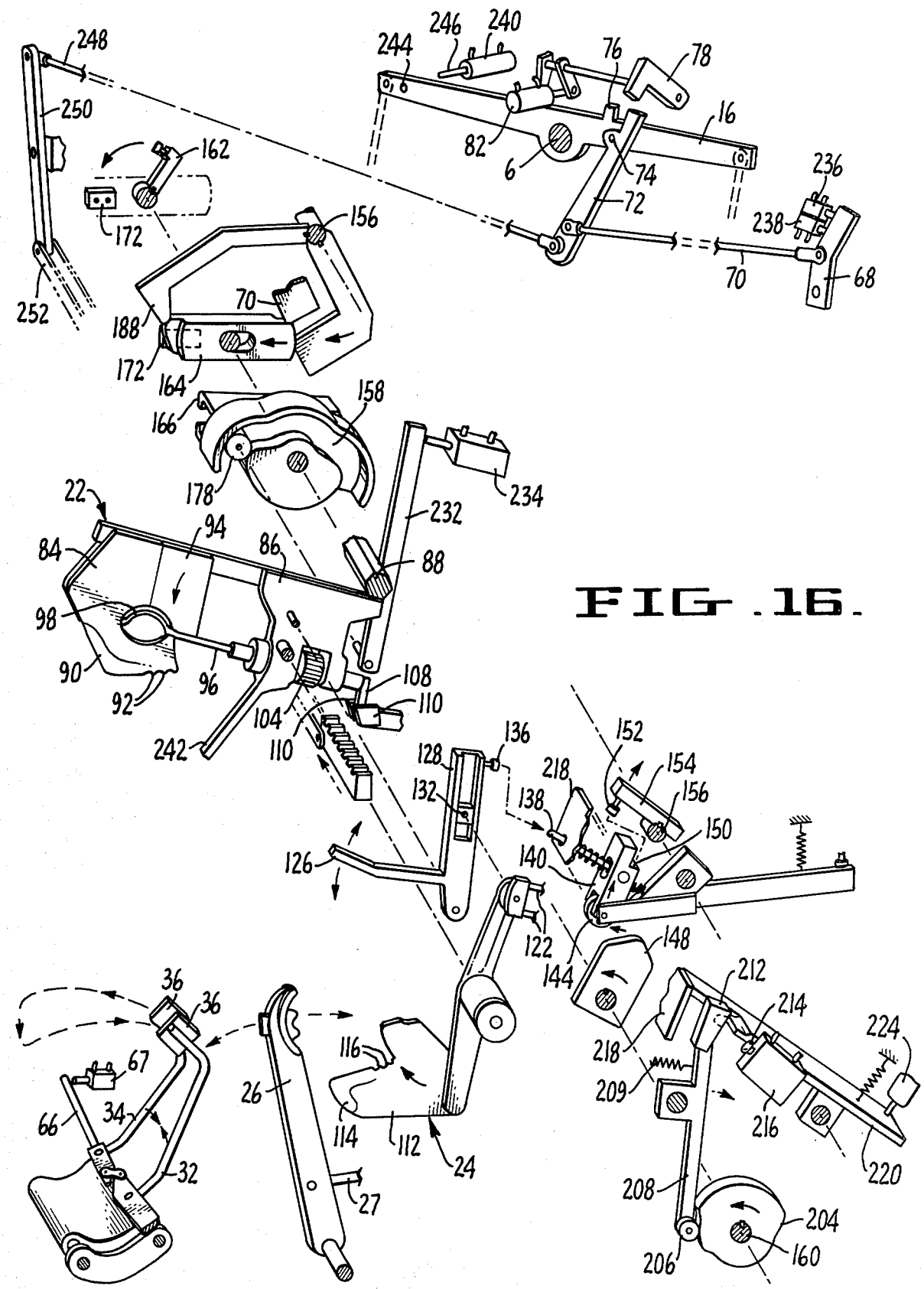
FIG. 16 is an exploded view of the apparatus of FIG. 1.
Figure 17:
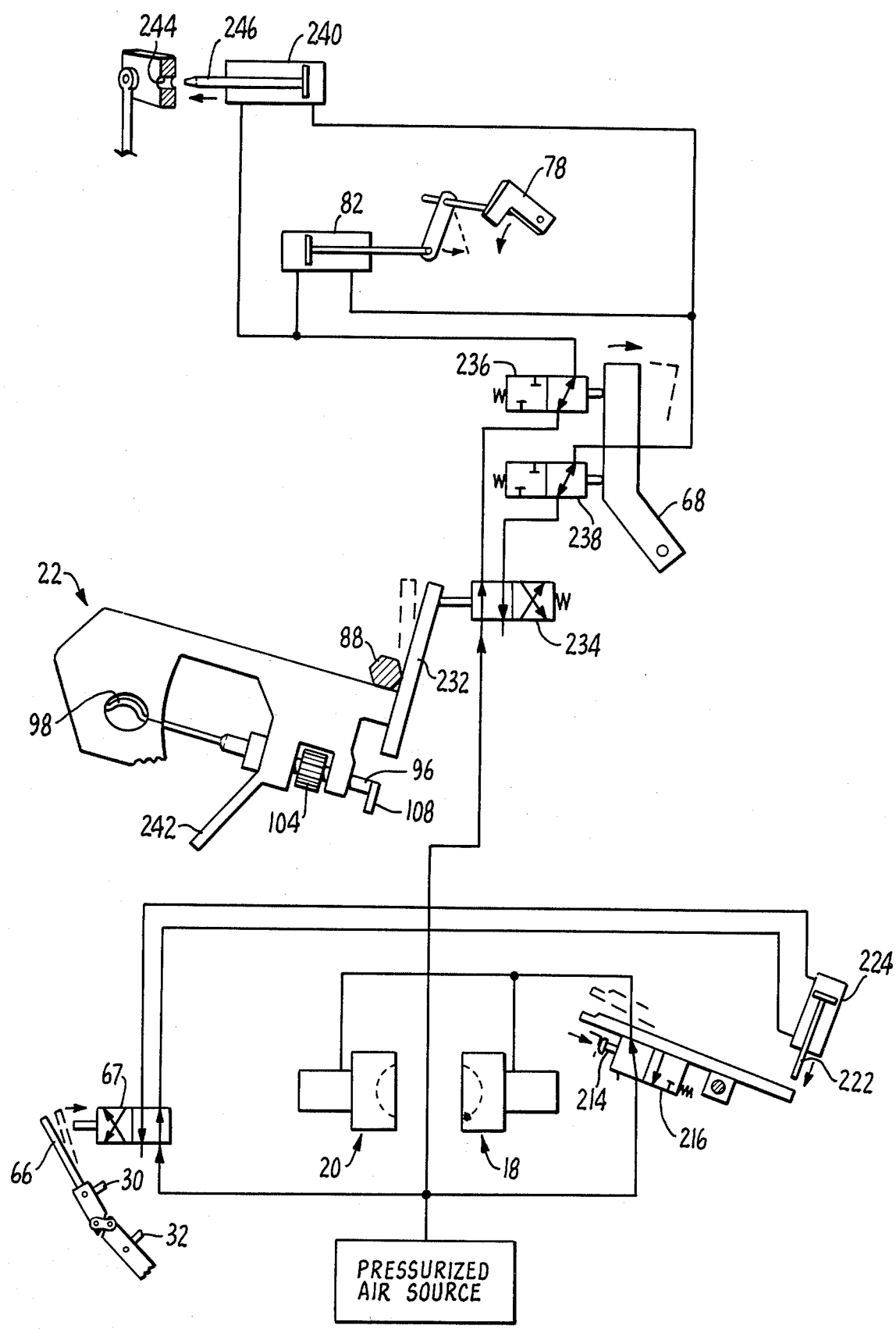
FIG. 17 is a schematic representation of the fluid actuating system of the apparatus of FIG. 1.
Figure 18:
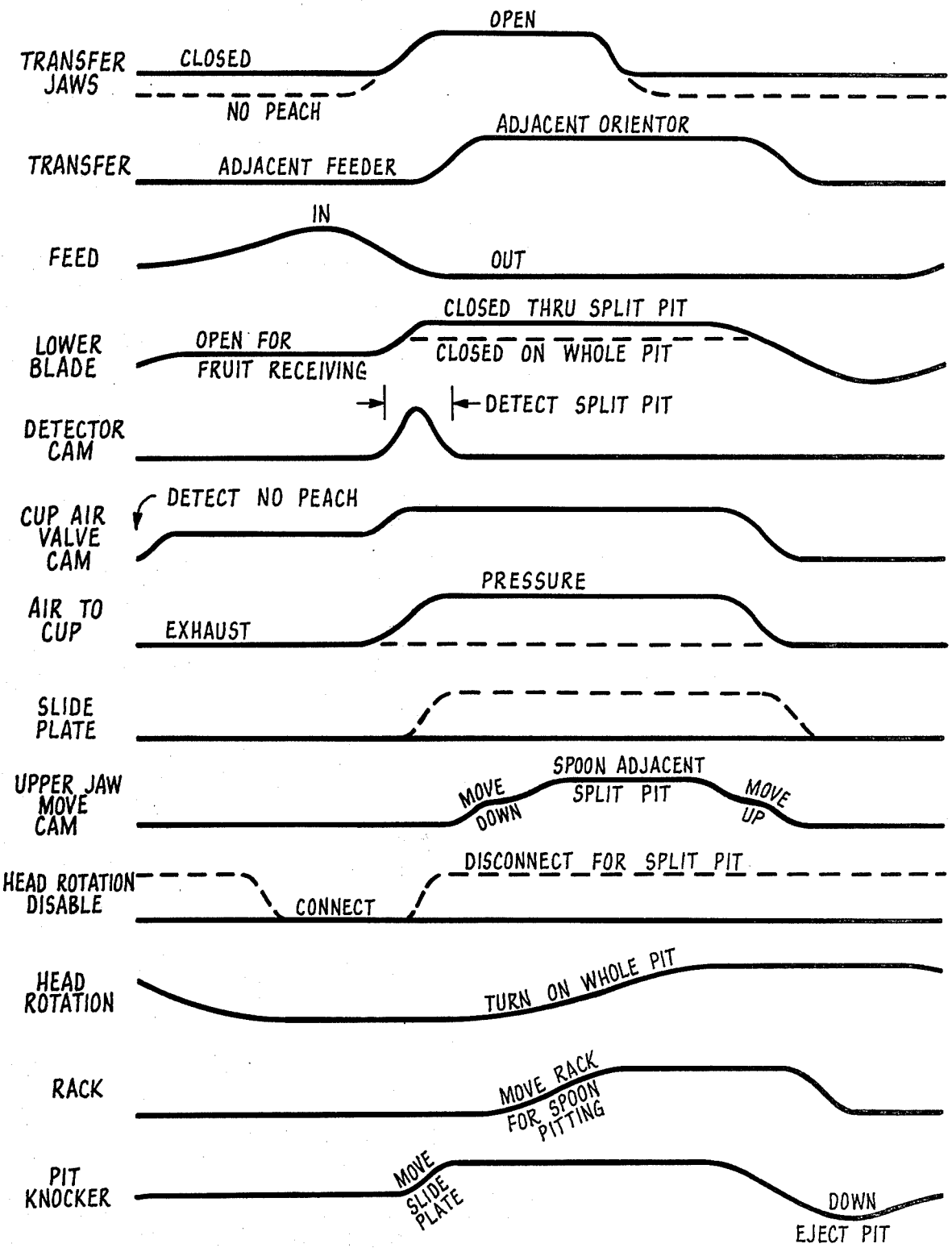
FIG. 18 is a timing diagram of the apparatus of FIG. 1.

Preferably, the various motions and operations of this apparatus are controlled by combinations of cam and linkages and air cylinders, which are illustrated in the exploded view of FIG. 16, in the fluid schematic of FIG. 17 and the timing diagram of FIG. 18. The manner of operation of this apparatus may be seen from these diagrams and is generally of the following manner.

When the cycle of operation of this method and apparatus is begun, the gripper heads 36 of the transfer assembly 30 are positioned adjacent the preceding processing station 28, which may suitably be an orienter or aligner for aligning the fruit such that the suture is in a predetermined plane and the stem end of the fruit is facing downwardly. If a fruit is present in that preceding station 28 for transfer to the pitter, the arms 32 and 34 and gripper heads 36 of the transfer apparatus 30 close on that fruit, grip it and move to the position illustrated in FIG. 1, all under the operation of the gear box 52 which is driven by shaft 54 from gear box 2. At that point the fruit in the transfer jaws 36 is between the feeder 26 and the pitter blade assemblies 22 and 24, again as illustrated in FIG. 1. Next, the feeder 26 pivots toward the open fruit bisecting blades 84 and 112, taking the fruit from the transfer jaws 36, and inserts the fruit, preferably stem end first, between the blades. As previously noted, the edges 90 and 114 of the respective blades are sharpened, with the rear portions of the blades being provided with pit gripping teeth 92 and 116. Thus, as the fruit feeding arm and cup 26 pivots toward the jaw assembly, the fruit is inserted onto and received by the cutting edges 90 and 114 of the upper and lower blade 84 and 112, with those blades producing a partial cut in the pulp or meat of the fruit and with feeder 26 forcing the fruit to the rear of the opening of the blades until the pit engages the upright rear portion of the lower blade and stops further insertion. It may be noted from FIG. 1 that feeder 26 is provided with a slot so that the arm may straddle the upper and lower blades as it inserts the fruit into the gap between the blades.

When the fruit has been fully inserted into the space between the upper and lower blades 84 and 112, the lower blade 112 is pivoted toward the upper blade 84 under the action of push rod 122 driven by crank 124 from gear box 2. If the fruit has a sound pit, the pivoting of the lower blade continues until the lower teeth 116 and the upper teeth 92 engage and grip the pit of the fruit as illustrated in FIG. 9.

When the upper and lower blades 84 and 112 have closed, and thus gripped the pit of the fruit to hold it against rotation, the sharpened edges 90 and 114 of the blades have also at least partially cut through the pulp or meat of the fruit generally in the plane of the suture, thus defining two fruit halves which are adhered to the pit.

At substantially the same time as the closing of the blades, driven by the gear and cam arrangement inside housing 2, that same gear and cam system effects a counterclockwise rotation of the bell crank 29. The motion of bell crank 29 is thus transmitted through push rods 31 and 33 to pivot the respective arms 12 and 14 about the frame mounted pivot 6 from the position illustrated in FIG. 1 to that illustrated in the fragmentary view of FIG. 10. This pivotal movement of the arms 12 and 14 thus brings the opposed gripper heads 18 and 20 from a location distal the upper and lower blades to a position proximal those blades, and on opposite sides of the blades and the plane defined thereby, so that gripper heads 18 and 20 are positioned adjacent the respective fruit halves for grippingly engaging those fruit halves.

At substantially the same time as the gripper heads are closed over the fruit halves, the rotation of cam 204 brings actuating member 212 on the end of arm 208 into operative engagement with the actuating button 214 of valve 216, the bobbin of which then is shifted to the right (FIG. 17) to supply air through the lines to the cups or diaphragms 190 on the gripper heads 18 and 20, to inflate those cups and provide for resilient gripping engagement of the fruit body halves.

As illustrated in FIG. 9, the engagement of the fruit pit between the teeth on the upper and lower blades stops further pivoting of the lower blade 112 toward the upper blade at a first position and thus prevents actuating member 136 from depressing plunger 138 and actuating the split pit activity. Thus, when the cam follower 148 is bumped by the detector cam 144, the step 150 of arm 140 will not engage the actuator 152. Accordingly, the blade assemblies 22 and 24 will remain in the raised position shown in FIG. 9 and the spoon pitting apparatus will not be actuated.

When the blade assemblies are in their upper position, as shown in FIG. 9, the arm 232 attached to upper blade assembly 22 is in the position shown urging the bobbin of valve 234 to the right against its spring load. In this position air is supplied to valve 236 as shown in FIG. 17. Prior to the clockwise pivoting of crank arm 68 by the gear box 2 from the solid line position shown in FIG. 17, pressurized air is supplied to the left side of actuator 82 to drive or hold the dog 78 downwardly into the space between the arm 72 and the tab 76 on the bell crank 16. This same air pressure also drives the shaft of actuator 240 to the right, holding it out of engagement with the hole 244 in the end of bell crank 16. With the dog 78 interposed between the end of arm 72 and the tab 76 on bell crank 16, clockwise rotation of crank arm 68 by the gear box 2 will effect counterclockwise pivoting of the bell crank 16 about pivot shaft 6. Such movement raises rack 192 and lowers rack 194, thus driving their respective pinions 196 and 198 in opposite directions. Since these pinions 196 and 198 are rigidly connected to rotatably mounted gripper heads 18 and 20 respectively, this movement of the racks 192 and 194 thus rotates the gripper heads 18 and 20, which are grippingly engaging the opposed fruit body halves, in opposite directions to effect the torquing separation of the two peach halves from one another and from the gripped pit in the well known manner. Since clockwise pivoting of the crank arm 69 closes off both valves 236 and 238, the air cylinders 82 and 240 are retained in their positions, noted above, during the movement of that crank arm 68. These positions will be retained at any time that the valve 234 is not allowed to shift to the left under the influence of its spring by the lowering of upper jaw assembly 22.

By the time this separation of the peach body halves from the pit has taken place, the cam 204 has rotated sufficiently to bring its lower profile portions into contact with the cam follower 206, thus allowing tension spring 209 to move the actuating member 212 away from the valve actuating button 214. In this condition, the pressurized air causing the resilient gripping diaphragms 190 in the pit gripping heads 18 and 20 to grip the fruit body halves is vented to the atmosphere, thus releasing the grip of the gripper heads upon the peach body halves. At this time also, the gear and cam assembly 2 causes the bell crank 31 to rotate counterclockwise, thus moving the arms 12 and 14 and their associated gripper heads apart, to the position illustrated in FIG. 1. With the grip on the peach body halves released, this moving apart of the gripper heads thus permits the fruit body halves to fall free into suitable collecting means. At this same time, the gear and cam assembly urges crank arm 124 in a counterclockwise direction, thus urging push rod 122 forward and pivoting the lower blade assembly 24 away from the upper blade and thus releasing the grip upon the fruit pit. The downward movement of the lower blade assembly 24 is necessarily accompanied by the counterclockwise rotation of the arm 128, to which the elongated pit knocker 126 is attached. Thus, the movement of the lower blade away from the upper blade will be accompanied by a sweeping movement of the pit knocker 126 downwardly alongside the upper blade 84 to knock loose any pit stuck in the pit gripping feet 92 of the upper blade. During the downward pivoting of the lower blade assembly, it is moved past the lower pit knocker 242 which is attached to and forms part of the upper blade support 86. Thus, this lower pit knocker 242 serves to knock loose any pit stuck in the pit gripping teeth 116 of the lower blade.

Return of the crank arm 68 to the position shown in FIGS. 1 and 5 will return bell crank 16 to its original position, "unwinding" the previous rotation of gripper heads 18 and 20.

The foregoing sequence of events reflects the manner of pitting a fruit having a sound pit. However, in operation, fruit having split pits may be presented to this pitting apparatus intermingled with fruit having sound pits. It is a feature of the present method and apparatus that either type of fruit may be pitted in any sequence without modification to the apparatus. The manner of sensing and pitting a fruit having a split pit is generally as follows.

Fruit having a split pit is presented to this pitting apparatus in the same manner as fruit having sound pits, with the feeder 26 forcing the fruit between the upper and lower blade 84 and 112, which are spaced apart. The lower blade is pivoted toward the upper blade in the manner described above, and the gripper heads 18 and 20 close to grip and engage the fruit, also as described above. However, the presence of a split pit within the fruit will permit the lower blade 12, and thus the entire lower blade assembly 24, to continue pivoting toward the upper blade under the driving influence of the crank 124 and the bifurcated push rod 122. This over-rotation of the lower blade assembly causes the lower blade to pass between the halves of the split pit without being stopped by engagement, as would happen with a sound pit. This over-rotation, under the driving influence of the push rod assembly 122, will similarly cause an over-rotation of the arm 128. Such an over-rotation of the arm 128 will bring the contacting element 136 into pushing contact with the plunger 138. The pushing of the plunger 138 will pivot the arm 140 to bring the step 150 under the actuating member 152 connected to pivot arm 154. In this configuration, the passage of the detector bump cam 148 under cam follower 144 will lift arm 140 and thus actuating member 152, and will pivot shaft 156, with its attached arms 180 and 188, in a clockwise direction.

Figure 14:
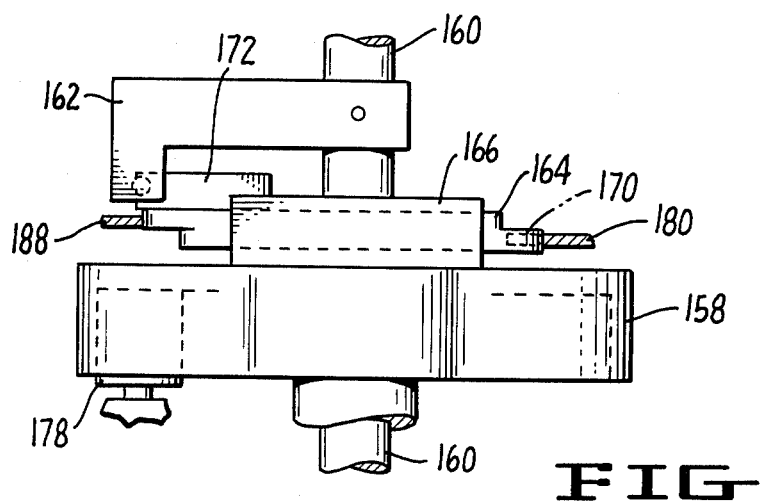
FIG. 14 is a plan view of the apparatus of FIG. 13.
Figure 13:
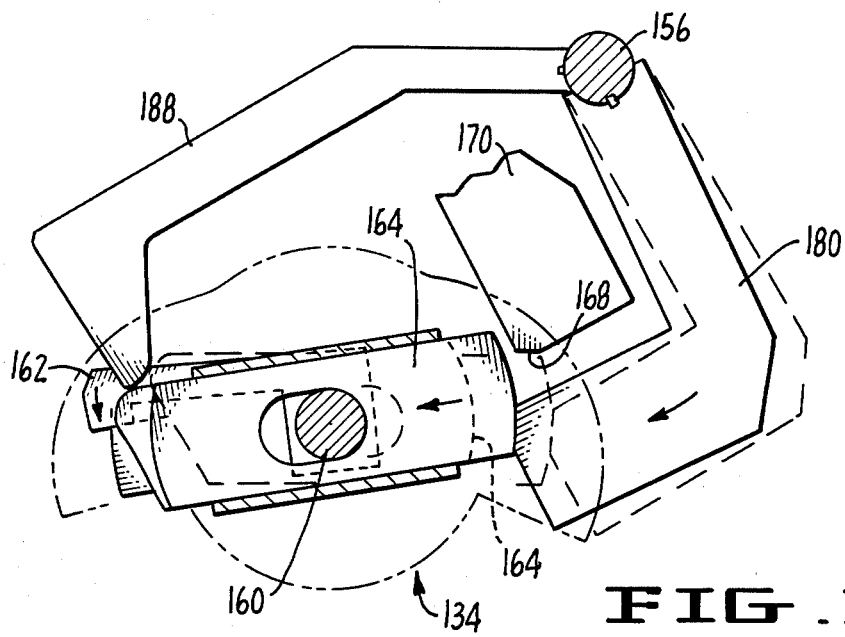
FIG. 13 is a fragmentary side sectional view, taken along line 13—13 of FIG. 5, of the blade assembly actuating cam structure.
Figure 15:
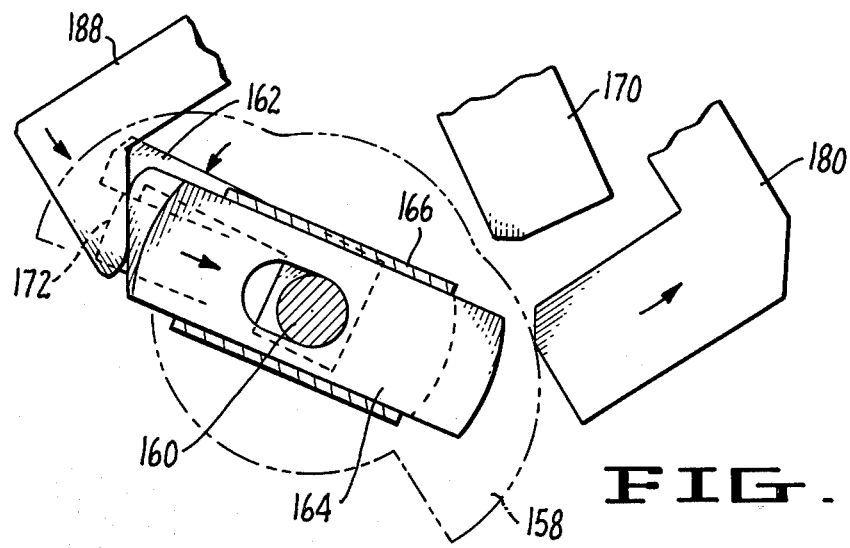
FIG. 15 is a fragmentary side sectional view, corresponding to FIG. 13, of the blade actuating cam assembly in another position during its actuating movement.

As described with respect to FIGS. 13–15, the actuation of arms 180 and 188 moves slide plate 164 out of engagement with blocking member 170 and into engagement with driving arm 162, to rotate cam 158 in a counter-clockwise direction. Such rotation of cam 158 permits movement of cam follower 178 in a direction generally toward the rear of the pitter. Since this cam follower 178 is attached to the lower portion of upper blade assembly 122 and of arm 232, which are mounted for pivotal movement on shaft 88, this movement of cam follower 178 causes counter-clockwise pivoting of the upper blade assembly and the arm 232.

As arm 232 pivots away from its engagement with four-way valve 234 (FIG. 17) the spring loading in that valve will drive the bobbin to the left. In this configuration, pressurized air from the source will flow through valve 234 to valve 238, while the line from valve 236 is vented, crank 69 at this point being in the position illustrated in the solid line representation of FIG. 17. From valve 238 the pressurized air will flow to the right hand side of both air cylinder 82 and air cylinder 240. Such air flow will drive the piston of actuator 82 to the left, pivoting dog 78 upwardly and out of its position between the end of arm 72 and actuating tab 76 on bell crank 16. The air supplied to cylinder 240 will drive its piston outwardly of the cylinder, driving the tapered shaft 246 into the locking hole 244 on the bell crank 16 and thus locking the bell crank against any pivotal movement about shaft 6. With bell crank 16 so locked, there can be no movement of the racks 192 and 194, and thus no rotation of the fruit gripping heads.

At the same time that arm 232 moves out of engagement with the plunger of valve 234, the entire upper blade assembly 22 correspondingly pivots downwardly from the position of FIG. 7 to the position of FIG. 8. This pivoting of the upper blade assembly 22, under the actuation of cam 158 and cam follower 178, brings the coring spoon 98 into position arcing just above the pit of the fruit (shown in phantom) gripped by the fruit gripping heads. As described with respect to FIG. 8, this pivoting movement of the upper blade assembly also brings meshing engagement between rack 182 and pinion 104, which is connected via shaft 96 to coring spoon 98. Such movement of the blade assembly also moves blade position tab 108, attached to shaft 96, out of the channel formed by the pair of spaced plates 110, such that shaft 96 is no longer held against rotation.

With bell crank 16 locked against movement, the upper blade moves through the fruit between the body and pit halves, coring spoon 98 moves from its position spaced from the fruit to a position immediately adjacent the split pit, and the pinion 104 engages with the rack 182, and the apparatus is configured for spoon pitting.

At this point, the gear and cam assembly 2 effects the normal clockwise pivoting of crank arm 68, which occurs in each pitting cycle. Thus, movement of the crank arm 68, to the broken line position of FIG. 17, effects a blocking of valve 236 and 238, retaining the air cylinders 82 and 240 in the position to which they have been driven, and effects a pulling on the push rod 70 and thus on the lower portion of linking arm 72. Since dog 78 has been removed from a position between the upper extremity of linking arm 72 and the actuating tab 76 atop bell crank 16, the arm pivots freely about its pivotal connection 74 to bell crank 16, while effecting no movement of that bell crank 16. The lower portion of arm 72 is also connected, via push rod 248 to pivot arm 250, which is pivotally attached to the pitter at a point intermediate the ends of the member 250. The end of pivot arm 250 opposite that connected to push rod 248 is connected, through a linkage 252, to the rack 182, such that pivotal movement of the arm 250 will effect longitudinal movement of the rack 182. Thus, the clockwise pivoting of the crank arm 68 will effect a similar clockwise pivoting of the crank arm 250 and movement of the rack 182 in the direction indicated by the arrow of FIG. 16. The engagements between rack 182 and pinion 184 will drive that pinion, shaft 96 and the coring spoon 98 in a clockwise direction, the rotation of the coring spoon 98 defining a body of revolution. This rotation of the coring spoon 98, controlled by the appropriate selection of the linkages to be one full revolution, effectively cuts a core, including the split pit, from the fruit body, such core corresponding to the body of revolution described by rotation of the coring spoon 98.

The timing of the cams is such that, shortly after the core is cut from the fruit, the rotation of cam 158 under the force of actuating arm 162 acting on actuating tail 172 of slide plate 164 will begin driving the upper blade assembly 22 back to its raised position.

At this same time, continued rotation of the cam 204 will cause the cam follower 206 to move off the high portion onto the lower profile portions of the cam, thus causing valve actuator 212 to move away from valve 216 and permit the bobbin of that valve to move back to the left. In this configuration further pressurized air from the source is blocked and the air in gripper heads 18 and 20 is vented to the atmosphere, thus releasing the gripping engagement of those gripper heads on the fruit body halves to release the cored fruit halves. At this time also the gear and cam assembly 2 is causing the crank arm 29 to pivot back in a counterclockwise direction, thus causing the gripper head arms 12 and 14 to move apart and away from the blade assemblies to release the cores and fruit halves, in the manner described above.

Raising of the upper blade assembly 22 also causes arm 232 to drive the bobbin of valve 234 back to the right, as illustrated in FIG. 17. The same action also slides pinion 104 out of engagement with rack 182 and brings tab 108 back into the channel formed by the pair of opposed plates 110, thus preventing rotation of shaft 96 and holding coring spoon 98 in its position lying in the plane of and shrouded by upper blade 84. At this point, the gear and cam assembly 2 pivots the crank arm 68 counter-clockwise back to its original position, similarly moving linkage arm 72 back to its original position and pivot arm 250 and thus rack 182 back to their original positions, ready for a subsequent cycle.

At substantially the same time as pressurized air is being exhausted from the gripper heads 18 and 20 and the upper blade assembly 22 is being raised to its original position, the gear and cam assembly 2 pivots crank arm 124 in a counterclockwise direction (FIG. 6) to drive the push rod 122 forward and thus pivot lower blade 112 away from upper blade 84. The counterclockwise pivoting of lower blade 112 moves it past pit knocker 242 which will squeeze any pit engaged by lower blade teeth 116 free from such engagement to clear the lower blade. Similarly, the forward movement of push rod 122 pivots arm 128 and its attached upper pit knocker 126 substantially counterclockwise to sweep that pit knocker 126 past and closely adjacent the teeth 92 of the upper blade 84 to knock loose any pit engaged by those teeth. The crank arm 124 then pivots a short way back in a clockwise direction to lift the pit knocker 126 away from the teeth 92 and to bring lower blade 112 back to its original, fruit-receiving position to receive the next fruit which is to be run through the pitting cycle.

As noted above, the split pit detector cam 148 is a "bump" cam which acts only momentarily to initiate the spoon pitting cycle. The purpose of this momentary actuation is to provide the spoon pitting operation only if the split pit is detected at or near the beginning of a pitting cycle and before any movement of the bell crank 16 and thus any rotation the fruit body gripper heads 18 and 20. Thus, if the pit gripper teeth 92 and 116 of the blades 84 and 112 momentarily engage and grip the edges of an apparently sound pit, and then at some subsequent time, such as during rotation of the gripper heads 18 and 20, move past the pit gripping position between the halves of the pit, indicating that the pit has been split, the blade and blade assembly shifting and coring spoon actuating apparatus will be disabled and not brought into action. This provision necessarily will result in the torque pitting and splitting without removal of a certain number of unsound pits, although the number of such split and non-removed pits will be relatively small.

The foregoing describes the normal, cyclic operation of this selective pitting apparatus, indicating the steps performed when fruit having a sound pit is presented and the steps performed when fruit having a split pit is presented to the pitter. For various reasons, however, there may occur instances in which the preceding fruit processing station, such as an aligner or orientor 28, which orients the blossom end and the suture of the fruit in a desired direction, fails to present a fruit to the pitting station during one of the predetermined cycles. Such an event may occur due to a blockage in the feeding of fruit to the aligner or for other reasons. In such an event it is desirable not to actuate the pit gripping apparatus, such as may conveniently function by inflation as described above, in order to avoid unnecessary wear on the pit gripping diaphragms. It is also desirable, in the interest of reducing unnecessary and wear-producing actuation of the apparatus, to avoid actuation of the split pit coring apparatus. The disablement of these two portions of the apparatus may be performed in this preferred embodiment in the following manner.

Figure 3:
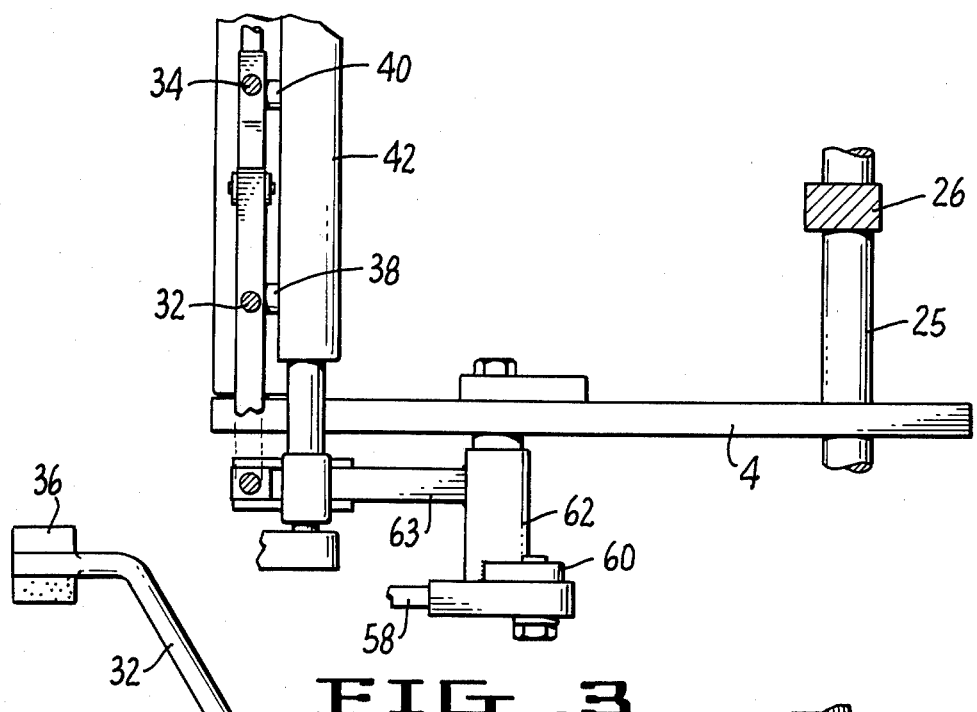
FIG. 3 is a plan view of the apparatus of FIG. 2.
Figure 2:
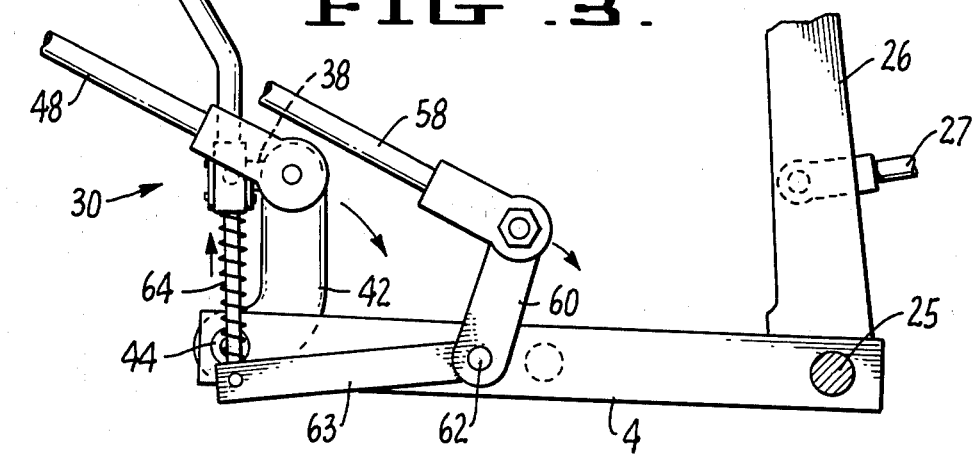
FIG. 2 is a fragmentary side elevation of the apparatus of FIG. 1 for transferring a fruit from a preceding processing station to the pitting station.
Figure 4:
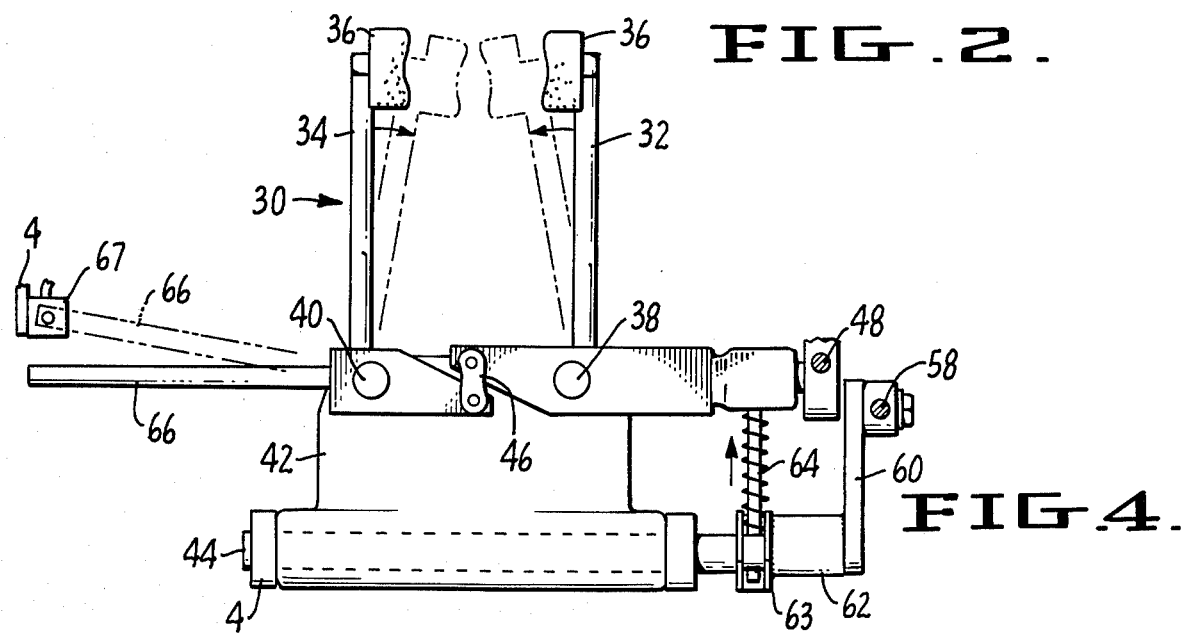
FIG. 4 is a front elevation of the apparatus of FIG. 2.

When there is no fruit to be supplied from the preceding processing station 28 during repetition of the operating cycle by the pitting station, there will be no fruit to stop the movement of the transfer gripper heads 36 toward one another, as described with respect to FIGS. 2-4. Thus, the arms 32 and 34 supporting these gripper heads will over-rotate toward one another and cause the valve actuating rod 66 attached adjacent the base of arm 34, to engage the plunger of valve 67 and drive its bobbin to the right in FIG. 17. Such actuation will then provide pressurized air to the back end of cylinder 224, driving its plunger 222 outwardly in the direction indicated in FIGS. 12 and 17. As described with respect to FIGS. 11 and 12, this actuation of cylinder 224 pivots the member 220 in a clockwise direction, lifting bracket 218 and thus lifting plunger 138 out of alignment with actuator 136, so that the plunger 138 cannot be actuated by arm 140, as is necessary to initiate the split pit operating sequence. The same pivoting of the arm 220 also lifts the valve 216 so that it can no longer be actuated by member 212 attached to the end of arm 208. Thus, when member 212 on the arm 208 is subsequently pivoted toward the valve 216 by cam 204, there will be no actuation of that valve and thus no air supplied to the gripper head assemblies 18 and 20 for inflation of the gripper cups 190.

When the member 220 is pivoted by actuator 224 at the time the actuator member 212 on arm 208 is moved toward that valve 216, that member 212 will slide under the tab 228, as shown in FIG. 12, and retain the member 220 in its clockwise pivoted position for the duration of the high portion of the cam 204, even though the supply of pressurized air to the actuator 224 is cut off prior to the end of the pitting cycle. Upon the passage of the high portion of cam 204 beyond cam follower 206, the member 212 will be pivoted out from under tab 228, thus enabling it to drop back to the position illustrated in FIG. 11 in which the valve 216 may be actuated by member 212 upon the next cycle.

As illustrated in FIG. 11, once the member 212 has begun its actuation of valve 216, its hook-like configuration overlies tab 228 and prevents any undesired spurious pivoting of the member 220 when a fruit has been presented to the pitting station.

While the foregoing describes a particularly preferred embodiment of the apparatus of this invention, it is to be recognized that numerous variations and modifications of this apparatus, all within the scope of the present invention, will readily occur to those skilled in the art. Thus, the foregoing description is intended to be illustrative only of the principles of this invention and is not to be considered limitative thereof, the scope of this invention being defined solely by the claims appended hereto and including all equivalents to the claimed structure.

What is claimed is:

1. Apparatus for use in the pitting station of a drupe processing operation in which fruit of the drupe type are processed at a series of processing stations, said apparatus operating cyclically at a predetermined rate and providing during each cycle for the loading of a single fruit received from a preceding station and then bisecting and pitting the fruit, regardless of whether its pit is sound or unsound, comprising:
    means for sensing the presence or absence of a fruit to be supplied from a preceding processing station to said pitting station;
    means operatively connected with said fruit presence sensing means for transferring fruit to said pitting station from said preceding station;
    a pair of generally coplanar body-bisecting blades having opposed cutting edges;
    means at said pitting station for supporting said blades to receive such a fruit transferred from said preceding station and, upon said fruit being positioned between said blades with its suture generally in the plane of said blades, for moving one blade toward the other in said plane to engage said pit in either a first position in which said blades are in gripping relation to a sound pit or past said first position to a second position with at least one blade within a split pit;
    fruit gripping means disposed adjacent opposite sides of said plane and supported for movement into coaxial gripping relation with the halves of a fruit and operable for gripping engagement with said fruit halves, the body of the fruit being bisected by said blades and the pit of which is engaged by said blades, and means for so moving said gripping means and for rotating them about their mutual axis upon the gripping engagement of a sound pit by said blades for shearing said fruit halves from said sound pit;
    a coring spoon mounted to one of said blades for rotation about an axis extending through said coring spoon, said coring spoon being dimensioned such that rotation about said transversely extending axis will describe a body of revolution at least as large as said pit; said coring spoon being mounted within an aperture which extends through said blade and which is spaced from said blade cutting edge, whereby the blade portion between the cutting edge and the aperture serves to shroud the coring spoon during moement of the blade through the fruit;
    means responsive to the movement of said one blade to said second position for shifting said blades and said coring spoon through the fruit from said second position, in which said coring spoon is remote from said pit, to a third position in which said blade cutting edges are remote from said pit and in which said coring spoon is adjacent said gripped fruit halves and extending around a portion of said pit; and
    coring spoon actuating means operatively connected to said coring spoon for rotating said coring spoon about said spoon axis of rotation when said blades and said coring spoon are shifted to said second position, whereby rotation of the coring spoon will cut the split pit from the fruit halves; and
    means for disabling the gripping operation of said fruit gripping means for one said cycle upon said fruit presence sensing means sensing the absence of a fruit for transfer to said pitting station.

2. The apparatus of claim 1 further comprising means for disabling the operation of said blade shifting means for one said cycle upon said fruit presence sensing means sensing the absence of a fruit for transfer to said pitting station.

3. The apparatus of claim 1 further comprising means for disabling rotation of said fruit gripping means upon the sensing of a split pit, whereby the halves of a fruit having a split may be held substantially stationary during the operation of the coring spoon to cut a split pit from the fruit halves.

4. The apparatus of claim 1 further comprising means for automatically disabling said blade and coring spoon shifting means if no split pit is detected prior to the initiation of rotation of said fruit gripping means.

* * * * *